(12) United States Patent
Yen et al.

(10) Patent No.: US 8,417,404 B2
(45) Date of Patent: Apr. 9, 2013

(54) PERSONAL, GREEN-ENERGY, TRANSPORTATION DEVICE WITH SINGLE WHEEL AND SELF-BALANCING FUNCTION

(75) Inventors: Ting-Jen Yen, Taipei (TW); Yu-Ting Chen, Hsinchu (TW); Feng-Guang Wu, Taipei (TW); De-In Shaw, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 366 days.

(21) Appl. No.: 12/908,154

(22) Filed: Oct. 20, 2010

(65) Prior Publication Data
US 2011/0238247 A1 Sep. 29, 2011

(30) Foreign Application Priority Data
Mar. 24, 2010 (TW) ................................ 99108688 A

(51) Int. Cl.
*G06F 19/00* (2011.01)
*B60L 11/00* (2006.01)

(52) U.S. Cl. .......................................... 701/22; 701/124

(58) Field of Classification Search .................. 701/22, 701/36, 124; 180/21, 205.1, 206.1–206.8; 280/47.3, 47.32
See application file for complete search history.

(56) References Cited

U.S. PATENT DOCUMENTS

| | | | | |
|---|---|---|---|---|
| 3,399,742 | A * | 9/1968 | Malick | 180/21 |
| 7,537,228 | B2 * | 5/2009 | Shimizu et al. | 280/205 |
| 7,556,277 | B2 * | 7/2009 | Lytle | 280/301 |
| 8,219,308 | B2 * | 7/2012 | Leeser | 701/124 |
| 2006/0279057 | A1 * | 12/2006 | Shimizu et al. | 280/205 |
| 2008/0029994 | A1 * | 2/2008 | Lytle | 280/293 |
| 2009/0223728 | A1 * | 9/2009 | Koide et al. | 180/197 |
| 2009/0266629 | A1 * | 10/2009 | Simeray et al. | 180/65.51 |
| 2010/0305841 | A1 * | 12/2010 | Kajima et al. | 701/124 |
| 2011/0056757 | A1 * | 3/2011 | Polutnik | 180/65.51 |
| 2011/0067939 | A1 * | 3/2011 | Takenaka | 180/21 |
| 2011/0139520 | A1 * | 6/2011 | Gulak | 180/21 |
| 2011/0175319 | A1 * | 7/2011 | Chen | 280/205 |
| 2011/0191013 | A1 * | 8/2011 | Leeser | 701/124 |
| 2011/0220427 | A1 * | 9/2011 | Chen | 180/21 |
| 2011/0259658 | A1 * | 10/2011 | Huang et al. | 180/65.51 |
| 2012/0046856 | A1 * | 2/2012 | Doi | 701/124 |

* cited by examiner

*Primary Examiner* — Khoi Tran
*Assistant Examiner* — Jason Holloway

(57) ABSTRACT

The present invention relates to a personal, green-energy, transportation device with single wheel and self-balancing function, and especially to a self-balancing single-wheel transportation device. The driver can drive the transportation device by manpower, and the transportation device would simultaneously execute a self-balancing function during driving. The transportation device comprises: a body, a wheel, a pedal portion, a roller chain, an in-wheel motor, and a sensing-control module, wherein the sensing-control module is used for detecting the balance condition of the body when the transportation device is driven, and then the sensing-control module controls the in-wheel motor to output a balancing torque for maintaining the self balance of the body.

4 Claims, 5 Drawing Sheets

PERSONAL, GREEN-ENERGY, TRANSPORTATION DEVICE WITH SINGLE WHEEL AND SELF-BALANCING FUNCTION

This application claims foreign priority from a Taiwan Patent Application, Ser. No. 099108688, filed on Mar. 24, 2010.

BACKGROUND OF THE INVENTION

1. Technical Field

The present invention relates to a personal transportation device with a single wheel, and more particularly, to a personal, green-energy, transportation device with a single wheel and a self-balancing function, in which when a driver moves the center of gravity thereof or provides a pedaling power to the personal transportation device, a sensing-control module detects the balancing change of the personal transportation device and an in-wheel motor outputs a balancing torque which can maintain the self-balance of the personal transportation device and assist the driver to move the device forward or backward.

2. Description of Related Art

The prototype of a bicycle is first appeared in the manuscript written by Leonardo da Vinci, however, an entity bicycle is manufactured in the end of the eighteenth century. After near one hundred year's evolution, modern bicycle is born in 1874. A British engineer named Roson designs and builds a bicycle with a roller chain and sprockets. In 1886, Another British engineer named John. K. Stahly designs a new style bicycle fitted with a fork and brakes, wherein the front wheel size is the same to the rear wheel size in the new style bicycle for maintaining balance. Moreover, rubber wheels are firstly used in the new style bicycle, therefore Stahly is later well-known and called as "father of bike". In 1888, Ireland's veterinary Dunlop, who mounts an inflatable rubber into the bicycle wheels, such that the bicycle wheels become inflatable and more complete.

In the early years, bicycle is treated as a main personal transportation device. However, with industrialization and the advancement of science and technology, medium-size and heavy vehicles begin to be disposed with a internal combustion engine for generating power. Internal combustion engines are also used widely to propel personal transportation devices such as motorcycles. In recent years, there are many countries aware of the environmental protection, so that the medium-size and heavy vehicles with the internal combustion engines cause major environment pollutions are often criticized by environmental groups. As a result, light-weight electric transportation devices capable of saving energy and protecting environment are researched, developed and manufactured under the advocacy of public policies and the sponsorship of government projects.

One of the personal light-weight electric transportation devices is firstly proposed by an American inventor Dean Kamen. For mimicking the sensory organs of balance and the feet of a man, Dean Kamen adapts a high-precision solid-state gyroscope and servomotors in the device; in addition, Dean Kamen utilizes a microprocessor as the central control unit. The device possesses self-balancing function and is sold with the name of "Segway". In the Segway, the high-precision solid-state gyroscope is used to detect the balance change of the device and to output a signal to the micro-processor. Then, after processing the signal, the micro-processor controls the servomotor for maintaining the dynamic balance of the whole device.

A variety of light electric transportation devices with self-balancing functions are next proposed, for example, "Enicycle" and "U3-X". Comparing to vehicles with internal combustion engines, the Segway, the Enicycle and the U3-X are more beneficial to the environment. However, since the power of Segway, Enicycle and U3-X comes solely from electricity, the driver's manpower cannot be input to these devices for being as a driving force. For this reason, the Segway, the Enicycle and the U3-X still cannot effectively save energy, such that they cannot be regarded as a true green-energy transportation device.

Therefore, in view of the above-mentioned light-weight electric transportation devices cannot be a true green-energy transportation device, the inventors of the present application have made great efforts to make innovative research and eventually conceived a personal, green-energy, transportation device with single wheel and self-balancing functions.

BRIEF SUMMARY OF THE INVENTION

The primary objective of the present invention is to provide a personal, green-energy, transportation device with a single wheel and a self-balancing function, in which the manpower can be used as a driving force, and an electric in-wheel motor is used for executing self-balancing functions. Moreover, a sensing-control module is used for detecting the balance change of the transportation device, and then outputs a control signal to an in-wheel motor to maintain the self-balance of the transportation device.

Accordingly, to achieve the abovementioned objective, the inventors propose a self-balancing single-wheel transportation device, which comprises: a body, a wheel, a pedal portion, a roller chain, an in-wheel motor, and a sensing-control module, wherein the body comprises a main shaft portion, at least one extension shaft portion, a supporting portion, wherein the main shaft portion has a first main shaft end and a second main shaft end. A handle is attached to the main shaft first end, and a first sprocket wheel is disposed between the main shaft first end and the main shaft second end. The body also comprises at least one extension shaft portion having a first extension shaft end and a second extension shaft end, in which the first extension shaft end is connected to the main shaft portion. The body further comprises a supporting portion having at least one supporting bar and a supporting base, wherein one end of the supporting bar is connected to the supporting base for supporting the supporting base.

The wheel is connected to the second extension shaft end through an center axle and has a second sprocket wheel, wherein the wheel can be driven by a driving force via the second sprocket wheel.

The pedal portion has two pedals and two axles, in which one end of the axle is connected to the pedal, and the other end of the axle is connected to the first sprocket wheel.

The roller chain is connected to the first sprocket wheel and the second sprocket wheel, wherein when the driving force is applied to the pedal portion for rotating the first sprocket wheel, the roller chain transmits a mechanical power to the second sprocket wheel, so as to make the wheel to rotate.

The in-wheel motor is disposed on the wheel and outputting a balancing torque to maintain the self balance of the body.

The sensing-control module is disposed on the supporting base, wherein the sensing-control module is used for sensing the balance condition of the body so as to control the in-wheel motor for keeping the self balance of the body; the sensing-control module comprises: an inertia-sensing unit, having an inclinometer and a gyroscope, wherein the inclinometer is used for detecting a tilt of the body and outputs a tilt signal, and the gyroscope is used for detecting an angular velocity of the body and outputting an angular velocity signal; a control unit, electrically connected to the inertia-sensing unit for receiving the tilt signal and the angular velocity signal, and outputting a control signal after processing the tilt signal and the angular velocity signal.

The motor-driving unit is electrically connected to the control unit for receiving the control signal, therefore the motor-driving unit controls the in-wheel motor to output the balance torque for maintaining the self balance of the body according to the control signal.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a personal, green-energy, transportation device with single wheel and self-balancing functions according to the present invention, embodiments of the present invention will be described in detail with reference to the attached drawings hereinafter.

Figure 1:
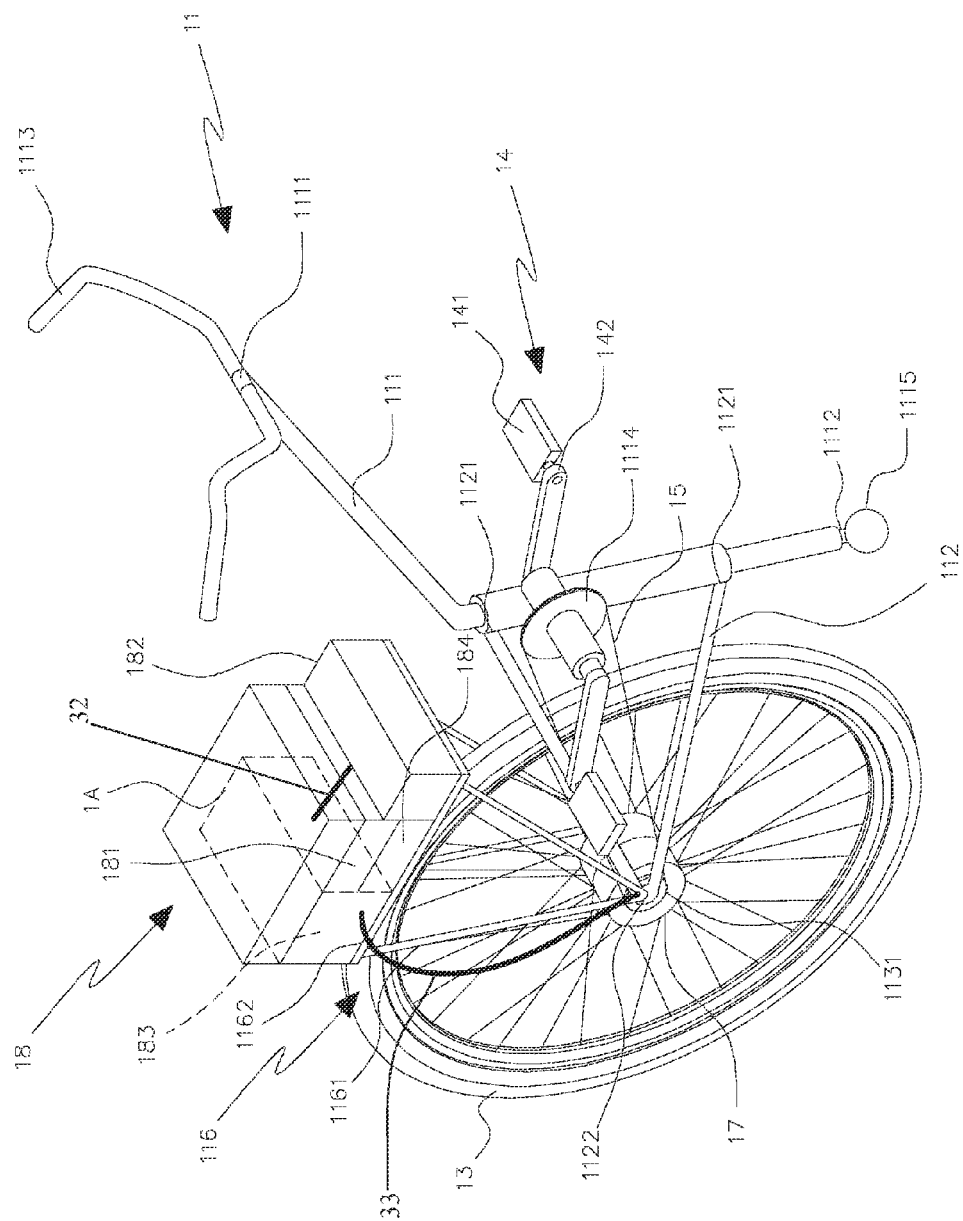
FIG. 1 is a framework diagram of a personal, green-energy, transportation device with single wheel and self-balancing function according to the present invention.

With reference to FIG. 1, which illustrates a framework diagram of self-balancing single-wheel transportation device according to the present invention. As shown in FIG. 1, the transportation device 1 includes: a body 11, a wheel 13, a pedal portion 14, a roller chain 15, an in-wheel motor 17, a sensing-control module 18, and a seat cushion 1A, wherein the body 11 includes: a main shaft portion 111, two extension shaft portions 112 and a supporting portion 116. The main shaft portion 111 has a first main shaft end 1111 and a second main shaft end 1112. Moreover, a handle 1113 is attached to the first main shaft end 1111, and a first sprocket wheel 1114 is disposed between the first main shaft end 1111 and the second main shaft end 1112. Each of the extension shaft portions 112 have a first extension shaft end 1121 and a second extension shaft end 1122, and the two first extension shaft ends 1121 are connected to the main shaft portion 111. The supporting portion 116 has two supporting bars 1161 and a supporting base 1162, wherein one end of the supporting bar 1161 is connected to the supporting base 1162 for supporting the supporting base 1162. In addition, the body 11 further includes a supporting member 1115, which is disposed on the main shaft second end 1112 and able to prevent the transportation device 1 from falling down when the power is used up.

Referring to FIG. 1 again, the wheel 13 is connected to the second extension shaft end 1122 through a center axle and has a second sprocket wheel 1311. The wheel 13 can be driven by a driving force via the second sprocket wheel 1311, wherein the driving force is generated by a driver. The pedal portion 14 has two pedals 141 and two axles 142. One end of the axle 142 is connected to the pedal 141, and the other end of the axle 142 is connected to the first sprocket wheel 1114. The roller chain 15 is disposed on the first sprocket wheel 1114 and the second sprocket wheel 1311. Therefore, when a driver pedals the two pedals 141, a mechanical force is generated and used as a driving force, and then the driving force is applied to the whole pedal portion 14 for making the first sprocket wheel 1114 rotate, such that the roller chain 15 drives the second sprocket wheel 1311 to rotate, so as to transfer the driving force to the wheel 13. The in-wheel motor 17 is disposed on the central part of wheel 13, wherein the in-wheel motor 17 can output a balancing torque to maintain the self balance of the body 11 when the transportation device 1 is driven.

Figure 2:
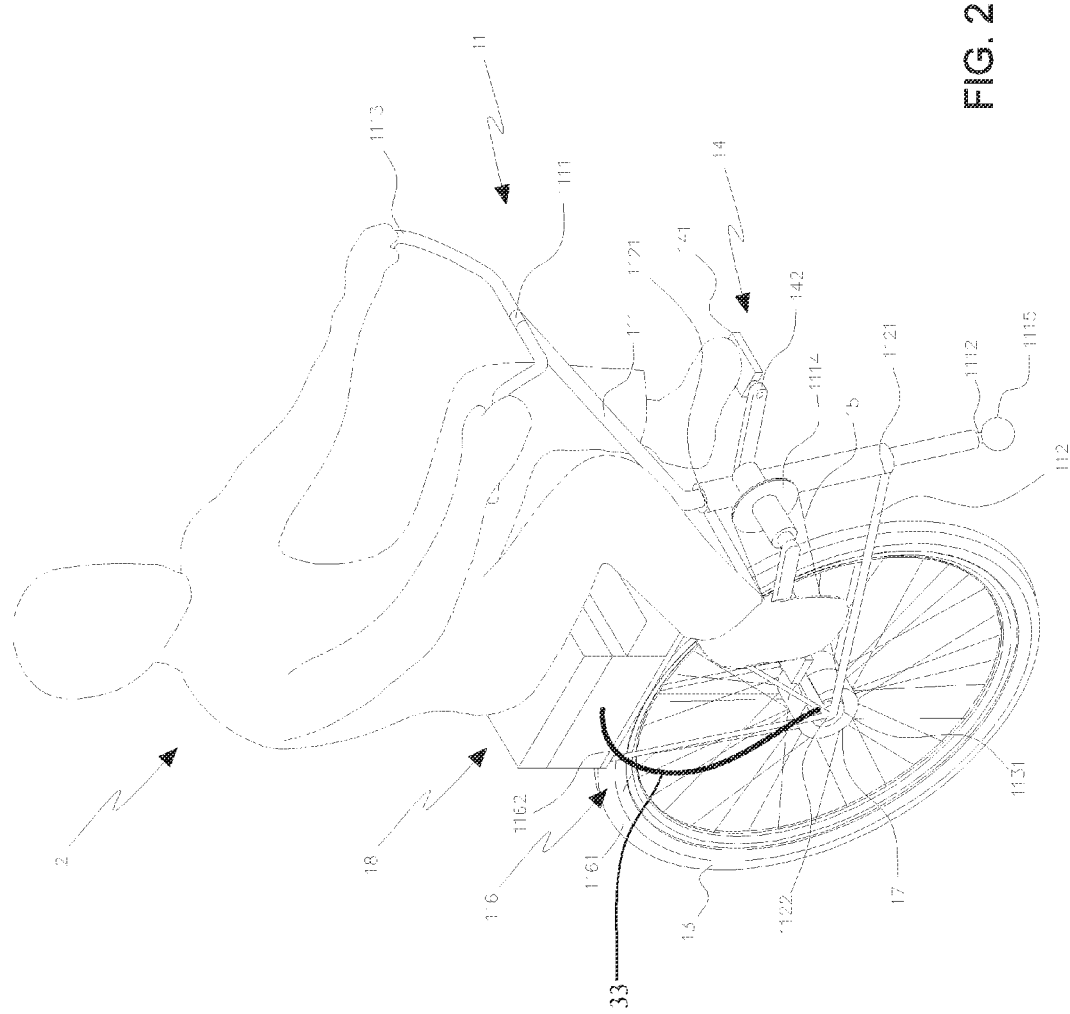
FIG. 2 is an operation schematic diagram of the personal, green-energy, transportation device with single wheel and self-balancing function according to the present invention.

The sensing-control module 18 is disposed on the supporting base 1162, wherein the sensing-control module 18 is able to sense the balancing condition of the body 11, and to control the in-wheel motor 17 to keep the self balance of the body 11. As shown in FIG. 1 and FIG. 2, the sensing-control module 18, electrically connected to the in-wheel motor 17 via a first electrical connection 33, includes: an inertia-sensing unit 181, a control unit 182 and a motor-driving unit 183. The inertia-sensing unit 181 consists of an inclinometer 1811 and a gyroscope 1812, wherein the inclinometer 1811 is used for detecting the tilt of the body 11 and outputs a tilt signal, and the gyroscope 1812 is used for detecting the angular velocity of the body 11 and outputs an angular velocity signal. The control unit 182 is electrically connected to the inertia-sensing unit 181 via a second electrical connection 32, used for receiving the tilt signal and the angular velocity signal and outputting a control signal after processing the tilt signal and the angular velocity signal. The motor-driving unit 183 is electrically connected to the control unit 182 for receiving the control signal, and then controlling the in-wheel motor 17 to output the balancing torque for maintaining the self balance of the body 11 according to the control signal. Moreover, the sensing-control module 18 further includes a power supply unit 184, which is electrically connected to the inertia-sensing unit 181, control unit 182, motor-driving unit 183, and the in-wheel motor 17 for supplying the electricity. When the self-balancing single-wheel transportation device 1 is driven downhill, or the personal, green-energy, transportation device 1 is driven at high speed, the extra driving force, i.e., the mechanical power, can be transformed into an electrical power by the motor-driving unit 183 and the control unit 182, and the electrical power is stored in the power supply unit 184.

Please refer to FIG. 2, which illustrates a schematic operation diagram of the personal, green-energy, transportation device. As shown in FIG. 2, when a driver 2 drives the transportation device 1, the driver 2 sits on the seat cushion 1A and holds the handle 1113 for controlling the body 11, In addition, the feet of the driver 2 are placed on the two pedals, respectively. The driver 2 drives the device by pushing the two pedals to rotate the first sprocket wheel 1114 and the second sprocket wheel 1311. By doing so, the transportation device 1 is driven to move by the manpower.

Figure 3:
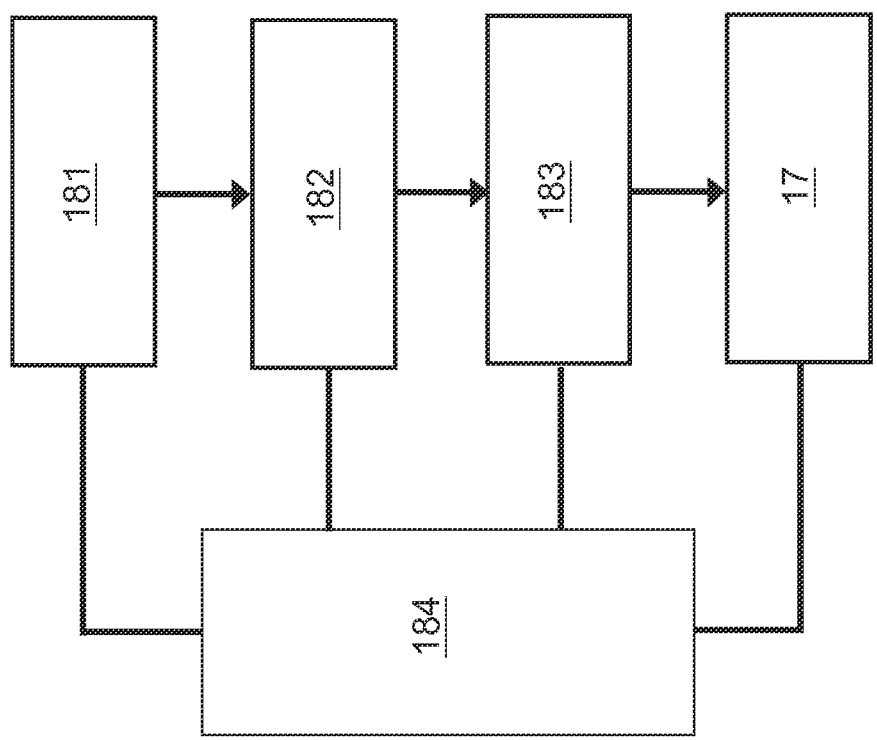
FIG. 3 is the framework diagram of a sensing control unit of the personal, green-energy, transportation device with single wheel and self-balancing function according to the present invention.

Referring to FIG. 3, which illustrates the framework diagram of the sensing-control unit. As shown in FIG. 2 and FIG. 3, when the driver 2 drives the transportation device 1 to move forward and backward, the inclinometer 1811 of the sensing-control unit 18 detects the tilt of the body 11 and the gyroscope 1812 detects the angular velocity of the body 11. Then, the control unit 182 processes the tilt signal and the angular velocity signal and outputs the control signal to the motor-driving unit 183. Therefore, according to the control signal, the motor-driving unit 183 controls the in-wheel motor 17 to output a balancing torque for keeping the self balance of the body 11.

Figure 4:
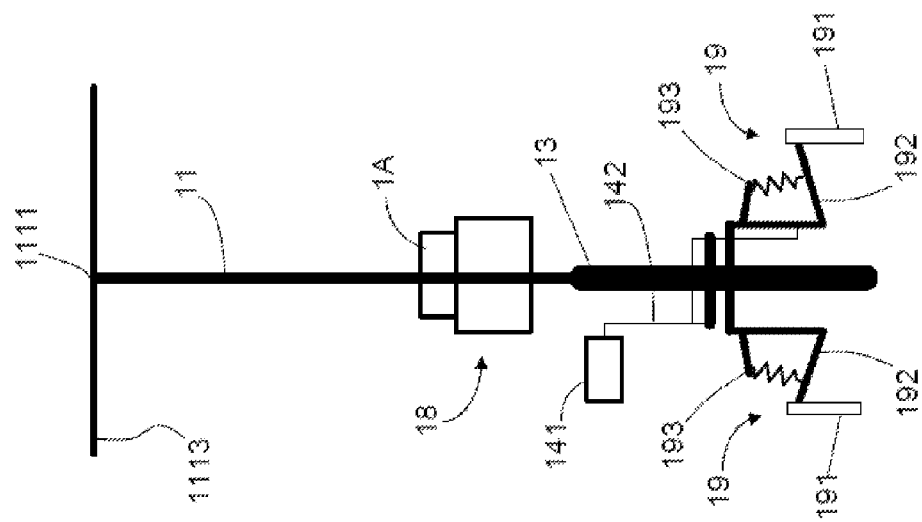
FIG. 4 is the framework diagram of the personal, green-energy, transportation device installed with two auxiliary mechanisms according to the present invention.
Figure 5:
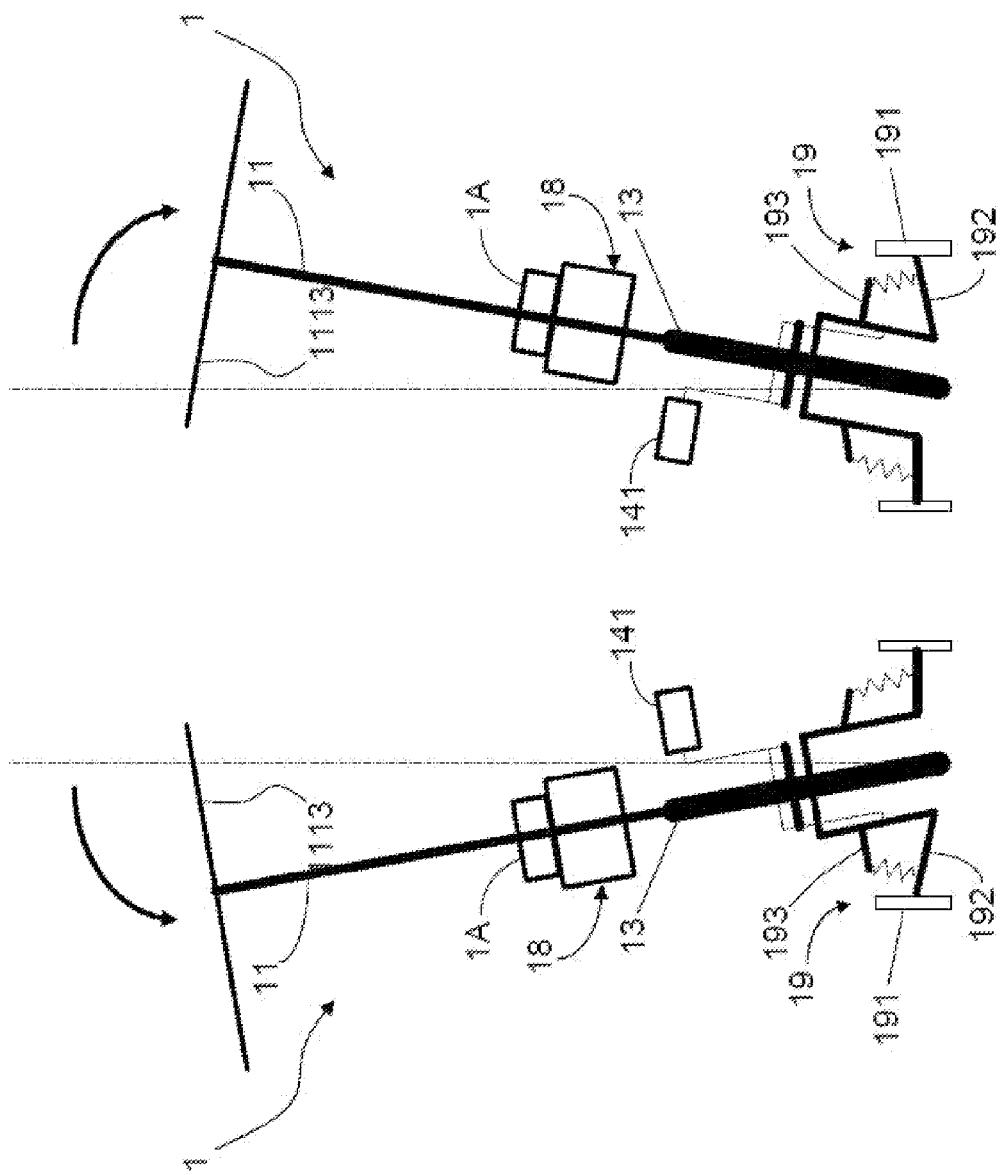
FIG. 5 is the operation schematic diagram of using the auxiliary mechanisms to turn the personal, green-energy, transportation device.

Referring to FIG. 4, which illustrates the framework diagram of the self-balancing single-wheel transportation device with two auxiliary mechanisms, and in FIG. 5, there is shown a schematic operation diagram of using the auxiliary mechanisms to turn the transportation device. As shown in FIG. 4 and FIG. 5, there are two auxiliary mechanisms 19 disposed on two sides of the wheel 13, respectively, and each of the auxiliary mechanisms 19 include: an auxiliary wheel 191, an auxiliary axle 192 and a shock-absorbing member 193. One end of the auxiliary axle 192 is connected to the second extension shaft end 1122, and the other end of the auxiliary axle 192 is connected to the auxiliary wheel 191, in addition, the shock-absorbing member 193 is disposed on the auxiliary axle 192. As shown in FIG. 5, the driver 2 (the driver 2 is not shown in FIG. 5) is able to turn the transportation device 1 when applying a mechanical brake on one auxiliary wheel 191, or shifts the center of gravity thereof to produce velocity deference between two opposite auxiliary wheels 191, such that the personal, green-energy, transportation device 1 may be turned around by a small radius of rotation.

Thus, the self-balancing single-wheel transportation device of the present invention has been disclosed completely and clearly in the above description. In summary, the present invention has the following advantages:

1. Through the sensing-control module and the in-wheel motor, it is able to keep the self-balance of the personal, green-energy, transportation device and make the device to move forward or backward.
2. Using the two auxiliary mechanisms, the driver can turn the personal, green-energy, transportation device by applying the mechanical brake or laterally change the center of gravity thereof.
3. When the individual green-energy carrying device is driven downhill, or is driven at high speed, the extra driving force, i.e., the mechanical power, can be transformed into the electrical power by the motor-driving unit and the control unit, and the electrical power is stored in the power supply unit.
4. The supporting member can hold the personal, green-energy, transportation device statically when the power of the personal, green-energy, transportation device is off; moreover, when the personal, green-energy, transportation device is held statically and the wheel is lifted off the ground, it can be used as an exercise bike. When the driver operates the exercise bike, the driver's manpower is transformed to the electrical power by the motor-driving unit and the control unit, and then the electrical power is also stored in the power supply unit; meanwhile, the sensing-control unit changes the mechanical resistance felt by the driver.

The above description is made on embodiments of the present invention. However, the embodiments are not intended to limit scope of the present invention, and all equivalent implementations or alterations within the spirit of the present invention still fall within the scope of the present invention.

We claim:
1. A self-balancing single-wheel transportation device, comprising:
   a body, comprising:
      a main shaft portion, having a first main shaft end and a second main shaft end, wherein a handle is attached to the first main shaft end, and a first sprocket wheel being disposed between the first main shaft end and the second main shaft end;
      at least one extension shaft portion, having a first extension shaft end and a second extension shaft end, wherein the first extension shaft end is connected to the main shaft portion; and
      a supporting portion, having at least one supporting bar and a supporting base, wherein one end of the supporting bar is connected to the supporting base for supporting the supporting base;
   a wheel, being connected to the second extension shaft end through a center axle thereof and having a second sprocket wheel, wherein the wheel can be driven by a driving force via the second sprocket wheel;
   a pedal portion, having two pedals and two axles, wherein one end of the axle is connected to the pedal, and the other end of the axle is connected to the first sprocket wheel;
   a roller chain, connecting the first sprocket wheel and the second sprocket wheel, wherein when applying the driving force to the pedal portion to rotate the first sprocket wheel, the roller chain transmits a mechanical power to the second sprocket wheel;
   an in-wheel motor, being disposed on the wheel and outputting a balancing torque to maintain the self balance of the body; and
   a sensing-control module, being disposed on the supporting base, wherein the sensing-control module is able to sense the balancing condition of the body and control the in-wheel motor to keep the self balance of the body, the sensing control module further comprising:
      an inertia-sensing unit, having an inclinometer and a gyroscope, wherein the inclinometer is adapted for detecting the tilt of the body and outputs a tilt signal, the gyroscope being used for detecting the angular velocity of the body and outputting an angular velocity signal;
      a control unit, being electrically connected to the inertia-sensing unit for receiving the tilt signal and the angular velocity signal, and outputting a control signal after processing the tilt signal and the angular velocity signal;
      a motor-driving unit, being electrically connected to the control unit for receiving the control signal, and according to the control signal, controlling the in-wheel motor to output the balance torque for maintaining the self balance of the body; and
      a power supply unit electrically connected to the inertia-sensing unit, the control unit, the motor-driving unit, and the in-wheel motor for supplying electricity;
   wherein a driver can drive the self-balancing single-wheel transportation device in three modes:
      the first mode is a pure electric mode in which the driver moves the center of gravity thereof forward or backward and a self-balancing function automatically drives the self-balancing single-wheel transportation device forward or backward accordingly;
      the second mode is a hybrid mode in which the driver can pedal the pedal portion so that manpower can assist the in-wheel motor to move the self-balancing single-wheel transportation device forward, and the amount of assistance depends on the posture of the driver; and the third mode is an exercise mode in which when the self-balancing single-wheel transportation device is held statically and the wheel is lifted off the ground, and a pedaling power from the driver is transformed to an electrical power by the motor-driving unit and the control unit, and the electrical power is then stored in the power supply unit.

2. The self-balancing single-wheel transportation device of claim 1, further comprising:

two auxiliary mechanisms, with each of the auxiliary mechanisms having an auxiliary wheel, an auxiliary axle and a shock-absorbing member, wherein one end of the auxiliary axle is connected to the extension shaft second end, the other end of the auxiliary axle being connected to the auxiliary wheel, and the shock-absorbing member being disposed on the auxiliary axle; and a seat cushion, being disposed on the supporting base and adapted for seating.

3. The self-balancing single-wheel transportation device of claim 1, wherein the body further comprises a support member, being attached to the main shaft second end and being able to hold the transportation device statically when the power is off.

4. The self-balancing single-wheel transportation device of claim 2, wherein a driver is able to turn the transportation device through the auxiliary wheel, the auxiliary axle and the shock-absorbing member if the driver laterally changes the center of gravity thereof.

* * * * *

UNITED STATES PATENT AND TRADEMARK OFFICE
CERTIFICATE OF CORRECTION

PATENT NO. : 8,417,404 B2
APPLICATION NO. : 12/908154
DATED : April 9, 2013
INVENTOR(S) : Ting-Jen Yeh et al.

It is certified that error appears in the above-identified patent and that said Letters Patent is hereby corrected as shown below:

On the title page

(12) United States Patent  "Yen et al." should read --Yeh et al.--

(75) Inventors:  the name "Ting-Jen Yen" should read --Ting-Jen Yeh--

Signed and Sealed this
Ninth Day of July, 2013

Teresa Stanek Rea
*Acting Director of the United States Patent and Trademark Office*